United States Patent Office 3,268,462
Patented August 23, 1966

3,268,462
ONE STEP PROCESS FOR PREPARING HIGH
IMPACT ALKYD RESINS
Pieter Bruin and Hendricus A. Oosterhof, both of Amsterdam, Netherlands, assignors to Shell Oil Company, New York, N.Y., a corporation of Delaware
No Drawing. Filed July 14, 1961, Ser. No. 124,000
Claims priority, application Netherlands, July 25, 1960, 254,156
4 Claims. (Cl. 260—22)

The present invention relates to a novel process for preparing chemical-resistant alkyd resins, and more particularly the invention relates to improvements in alkyd resins obtained by reacting esters of alpha-alkyl monocarboxylic acids containing an epoxy group in the alcoholic part of the ester or molecule with polybasic carboxylic acids or anhydrides thereof.

The above-mentioned esters are of greatly varying types both as regards the alcoholic part of the ester molecule and the monocarboxylic acid from which they are derived. However, the ester linkage represents a weak point and thus reduces its stability. Therefore, although it is possible to utilize a wide variety of fatty acids by incorporating them into the completed alkyd resin, the disadvantage of low stability has been present together with the advantages of desired oil length, increased flexibility, and the like. It has been found that increased stability is obtained when alpha-alkyl carboxylic acids are utilized and that particularly stable ester linkages are obtained with alpha-alpha-dialkyl carboxylic acids.

It has also been found that epoxy esters of alpha-alkyl carboxylic acids are particularly suitable because of improved reaction control whereby undesirable side reactions are minimized. Such resins and the process for making such resins are more fully explained in the copending United States patent application Serial No. 29,165, filed May 16, 1960, by Nantko Kloos. An improvement in the said process has now been found which provides products having a high chemical resistance and hardness, and also a high impact strength.

The improvement is also suitable for use with alkyd resins incorporating monoglycerides of alpha-alkyl-monocarboxylic acids as disclosed and claimed in the copending United States patent application Serial No. 28,865, filed May 13, 1960, now U.S. Patent No. 3,178,454, issued April 13, 1965, of Nantko Kloos and Jacques J. J. Drost.

According to the invention, these high grade alkyd resins are prepared by a process for preparing alkyd resins from a reaction mixture containing epoxyl alkyl esters of alpha-alkyl monocarboxylic acids, at least one polyol, and a member of the class consisting of polybasic carboxylic acids and polybasic carboxylic acid anhydrides, in combination with the step of including a member of the class consisting of hydroxycarboxylic acid, hydroxycarboxylic acid esters, lactides and lactones in the reaction mixture.

More particularly the structural elements in the resin molecule which originate from hydroxycarboxylic acids and the like impart an increased resistance to sudden and pronounced deformation as occurs in the impact strength tests. Very good results are generally obtained when the weight of the hydroxycarboxylic acids is 10 to 20% of the weight of the alkyd resins also prepared from these hydroxycarboxylic acids. An improvement is even noticeable at a value of less than 10% and often even less than 5%. Similarly, these ranges are generally suitable for hydroxycarboxylic esters, lactides and lactones.

Examples of hydroxycarboxylic acids and esters, lactides and lactones thereof are glycollic acid and the glycolide, lactic acid and the lactide, gamma-hydroxybutyric acid and gamma-butyrolactone, delta-hydroxyvaleric acid and delta-valerolactone, the hydroxystearic acids obtainable by the addition of water to the double bond of oleic acid, the 12-hydroxystearic acid (obtainable by hydrogenation of ricinoleic acid), polybasic hydroxycarboxylic acids such as citric acid, malic acid and tartaric acid, and also esters of hydroxycarboxylic acids and of glycerol, glycidol and other alcohols, such as hydrogenated or unhydrogenated ricinoleic acid or monoglycerides obtained by treating ricinoleic acid with glycerol.

The monocarboxylic acids used to make the epoxy esters used in the preparation of alkyds are generally aliphatic monocarboxylic acids; particularly those having at least 4 and not more than 20 carbon atoms in the molecule are important. Cyclo-aliphatic or aromatic monocarboxylic acids may be also be used. The important characteristic is that the acids have secondary or tertiary carboxyl groups.

Preferably these acids are obtained by reacting with carbon monoxide and water, olefins having at least 3 carbon atoms in the molecule. This reaction takes place under the influence of acid catalysts, for example, phosphoric acid, sulfuric acid, and complexes of phosphoric acid with boron fluoride. The reaction is more thoroughly described in the copending patent application of Marinus J. Waale and Johan M. Vox, Serial No. 858,609, filed December 10, 1959, now U.S. Patent No. 3,059,004, issued October 16, 1962. As indicated in this application, the carboxyl group adds on at the double bond and even when the double bond is terminal, the addition is such that a strong tendency for tertiary groups to be formed by isomerization is noted. Branching at the double bond also provides a tertiary carboxyl group. Very attractive products are obtained when monoolefins having at least 8 and not more than 18 carbon atoms in the molecule are thus converted into monocarboxylic acids and subsequently via the epoxy alkyl esters of these acids into alkyd resins. Preferably, more than 10% of the monocarboxylic acids will be tertiary in the carboxyl group.

The epoxy alkyl esters of the above monocarboxylic acids may be prepared in any of the known ways for obtaining epoxy esters from monocarboxylic acids. A preferred method for preparing such esters is set forth in a copending United States patent application of Nantko Kloos and Jacques J. J. Drost, Serial No. 28,865, filed May 13, 1960.

Briefly speaking, a monocarboxylic acid salt (for example, alkali metal salts or quaternary ammonium salt) may be reacted with epichlorohydrin. This reaction is preferably carried out by gradually adding a liquid phase consisting of epichlorohydrin or containing the latter in a stream of a concentrated solution of the salt in water, or by gradually adding a concentrated solution of an alkali metal hydroxide to a liquid phase containing both epichlorohydrin and a monocarboxylic acid. The water supplied and any water formed during the reaction may be removed by azeotropic distillation. According to another process, a dry salt of a carboxylic acid is suspended in a liquid phase consisting of or containing epichlorohydrin. Tertiary amines and quaternary ammonium salts may act as catalysts in this reaction.

Monocarboxylic acid may also be reacted as such with epichlorohydrin with the use of nitrogen bases or salts thereof as catalysts. When monocarboxylic acids and epichlorohydrin are used in a stoichiometric ratio, or when an excess of dicarboxylic acid is used, a chlorohydrin is formed from which a glycidyl ester may be produced by treating with alkaline substances such as alkali metal hydroxides. If epichlorohydrin is reacted with a monocarboxylic acid in a mole ratio of at least 2:1, the glycidyl ester is immediately formed. In this case, the preferred catalysts are tertiary amines and quaternary ammonium salts.

Monocarboxylic acid salts may also be reacted with chlorohydrin. An ester is then obtained from which the desired glycidyl ester may be formed by treating with an alkaline substance. Homologues and corresponding bromine compounds may be used in the described processes instead of epichlorohydrin and chlorohydrin.

Although among the epoxy alkyl esters the glycidyl esters are the most important for the present process, use may suitably be made of esters in which the molecule contains a different epoxy alkyl group, for example, 2,3-epoxybutyl, 3,4-epoxybutyl, 2,3-epoxybutyl, 2,3-epoxy-4-phenyloctyl, 1-ethyl-2,3-epoxyhexyl, 2,3-epoxy-4,5- diethyldodecyl and epoxycyclohexyl.

Illustrative examples of polybasic carboxylic acids that may be used to prepare the alkyl resins of this invention include malonic acid, succinic acid, glutaric acid, adipic acid, azelaic acid, sebacic acid, maleic acid, fumaric acid, phthalic acid, tetrahydrophthalic acid, isophthalic acid, terephthalic acid, hexahydrophthalic acid, diglycolic acid, xylyl succinic acid and dimerized fatty acids of drying oils such as soyabean oil. Examples of suitable dicarboxylic acid anhydrides are those of succinic acid, glutaric acid, maleic acid, phthalic acid, as well as Diels-Alder adducts of maleic anhydride with various dienes such as terpenes and cyclopentadiene.

The temperature during the production of alkyl resins is generally in the range of from 140° to 270° C., but in exceptional cases it is occasionally outside this range.

The proportions of polybasic carboxylic acid used will be related to the hydroxyl content with the epoxy ester considered as hydroxyl for this purpose, and added glycerine or the like is also included. Thus the ratio of acid to base will be such that there will be from about 1 to about 1.3 hydroxyl groups per carboxylic acid group. Stated another way, the equivalent weight of the hydroxyl or alcohol components will be from about 1 to about 1.3 times the equivalent weight of the carboxylic acid components.

In order to accelerate the reaction there may be incorporated into the reaction mixture alkalis, such as alkali metal hydroxides and strong organic bases, for example, quaternary ammonium bases, amines, particularly tertiary amines, phosphoric acid, sulphonic acids, Friedel-Crafts catalysts (Lewis acids) such as $BF_3$, if desired in the form of a complex, for instance, with an ether or an amine, also all other substances known as catalysts for this type of reactions. If desired, a solvent may be present during the reaction and inert solvents in particular, such as xylene and benzene, are suitable.

To ensure that the alkyl resins have the lightest possible color, it is advisable to carry out the reaction in an oxygen-free atmosphere.

In particular when the polyhydroxy compounds, as defined above, contain only two hydroxyl groups, alkyd resins having excellent properties are obtained according to the invention when in addition to one or more of the said polyhydroxy compounds one or more polyols having three or more hydroxyl groups are present during the reaction. Examples of such polyols suitable for use are glycerol, pentaerythritol, pentane and hexane triols and trimethylol propane.

The resins produced according to the invention are very suitable for use in paints, lacquers and varnishes, and particularly, for use in stoving enamels. They may be worked up by the conventional methods with pigments, diluents, phenol formaldehyde resins, urea formaldehyde resins, melamine formaldehyde resins, thickeners and other usual components. Coatings formulated with these alkyd resins have outstanding hardness, excellent flexibility, impact strength and adhesion and have outstanding resistance to chemicals. The resins have a light color and are therefore very suitable for the manufacture of white and light-colored paints and lacquers.

The invention will be elucidated with reference to some examples. The parts are parts by weight. The hardness was determined according to Buchholz; the impact strength according to the British Standard Method; the flexibility by bending an enamelled metal panel around a mandrel which successively had a diameter of ¼, ⅛ and ⅟₁₆ inch and establishing the presence of cracks in the lacquer film. The Erichson penetration was determined by slowly pressing a metal ball in an enamelled metal panel which was supported on all sides around the point of impact by a ring, and determining the distance in millimeters over which this ball could be pressed into the panel before cracks developed in the lacquer film.

The resistance to chemicals was assessed by exposing a lacquer film at 25° C. for 7 days to the action of a sodium hydroxide solution of 5% cencentration and of the vapors of an acetic acid solution of 5% concentration. The rating 0 means that the film was entirely destroyed and the rating 10 that it was not attacked.

Example 1

The starting materials were alkenes having from 8 to 10 carbon atoms in the molecule. They were obtained as a fraction of a product formed in the thermal vapor-phase cracking of a paraffinic feedstock in the presence of steam. The dienes originally present in this fraction were converted into mono-olefins by partial hydrogenation. The alkenes were substantially unbranched. The double bonds were present almost exclusively between non-terminal carbon atoms.

The alkenes were converted with carbon monoxide and water into carboxylic acids, the temperature being 60° C., the carbon monoxide pressure 100 atmospheres, a catalyst being used containing $H_3PO_4$ and $BF_3$ in equimolar quantities. The crude carboxylic acids were neutralized with sodium hydroxide after being separated from the catalyst, whereupon the aqueous sodium salt solution was freed from the hydrocarbons still present by finally extracting it with gasoline.

The sodium salt solution was gradually added to a tenfold molar quantity of epichlorohydrin, the mixture being maintained at the boiling point and water removed by azeotropic distillation. In this way, glycidyl esters of alpha-alkyl monocarboxylic acids having 9 to 11 carbon atoms were obtained.

A mixture of 1110 g. of phthalic anhydride
317 g. of glycerol
984 g. of glycidyl esters of monocarboxylic acids branched at the alpha position
426 g. of 12-hydroxystearic acid
280 g. of xylene was kept for 6 hours at 240° C. in a nitrogen atmosphere while it was stirred. The water formed was removed by azeotropic distillation.

A stoving enamel produced from 70 parts of this resin, 30 parts of urea formaldehyde resin and 90 parts of titanium white was applied to thin steel sheets and baked at 150° C. for 40 minutes.

On testing the resultant films, the following results were obtained:

Hardness (Buchholz) _____ 100
Impact strength (lb./in.) _____ 40
Flexibility (bend-testing around a mandrell having a diameter of ⅟₁₆ inch)
Erichson penetration, mm. _____ 6.2
Resistance to NaOH _____ 7
Resistance to acetic acid (vapor) _____ 9

When the hydroxystearic acid was omitted, a hardness (Buchholz) of 118 and an impact strength of 3 lb./in. was found on testing.

Example II

A resin was prepared from:

1110 g. of phthalic anhydride
235 g. of glycerol
1203 g. of the above glycidyl esters
135 g. of 12-hydroxystearic acid as described in Example I and was worked up and tested in the same manner.

The following results were obtained:

Hardness ---------------------------------- 105
Impact strength (lb./in.) ------------------ 16
Flexibility (bend-testing around a mandrel having a diameter of ⅛ inch).
Erichson penetration, mm. ------------------ 7.5
Resistance to NaOH ------------------------- 7
Resistance to acetic acid (vapor) ---------- 10

Example III

A resin was prepared from:

1110 g. of phthalic anhydride
235 g. of glycerol
1203 g. of the above glycidyl esters
114 g. of glycollic acid as described in Example I and was worked up and tested in the same manner.

The following results were obtained:

Hardness ---------------------------------- 111
Impact strength (lb./in.) ------------------ 20
Flexibility (bend-testing around a mandrel having a diameter of ⅛ inch)
Erichson penetration, mm. ------------------ 6.9
Resistance to acetic acid (vapor) ---------- 10

We claim as our invention:

1. A one-step process for preparing high impact alkyd resins which comprises reacting at a temperature between about 140° and 270° C., (1) epoxy alkyl esters of alpha-alkyl saturated monocarboxylic acids prepared from aliphatic monocarboxylic acids having at least 4 carbon atoms in the molecule, said acids being obtained by reacting olefins with carbon monoxide and water under the influence of acid catalysts, (2) at least one polyol having at least three hydroxyl groups, (3) a member of the class consisting of polybasic carboxylic acids and polybasic carboxylic acid anhydrides and (4) a hydroxystearic acid, said components being employed in the ratio so that the equivalent weight of the hydroxyl components range from about 1 to about 1.3 times the equivalent weight of the carboxylic acid components.

2. A one-step process for preparing high impact alkyd resins which comprises reacting at a temperature between about 140° and 270° C., (1) epoxy alkyl esters of alpha-alkyl saturated monocarboxylic acids prepared from aliphatic monocarboxylic acids having at least 4 carbon atoms in the molecule, said acids being obtained by reacting olefins with carbon monoxide and water under the influence of acid catalysts, (2) at least one polyol having at least three hydroxyl groups, (3) a member of the class consisting of polybasic carboxylic acids and polybasic carboxylic acid anhydrides and (4) 12-hydroxystearic acid, said components being employed in the ratio so that the equivalent weight of the hydroxyl components range from about 1 to about 1.3 times the equivalent weight of the carboxylic acid components.

3. A one-step process for preparing high impact alkyd resins which comprises reacting at a temperature between about 140° and 270° C., (1) epoxy alkyl esters of alpha-alkyl saturated monocarboxylic acids prepared from aliphatic monocarboxylic acids having at least 4 carbon atoms in the molecule, said acids being obtained by reacting olefins with carbon monoxide and water under the influence of acid catalysts, (2) at least one polyol having at least three hydroxyl groups, (3) a member of the class consisting of polybasic carboxylic acids and polybasic carboxylic acid anhydrides and (4) glycollic acid, said components being employed in the ratio so that the equivalent weight of the hydroxyl components range from about 1 to about 1.3 times the equivalent weight of the carboxylic acid components.

4. A one-step process for preparing high impact alkyd resins which comprises reacting at a temperature between about 140° and 270° C., (1) glycidyl esters of alpha-alkyl monocarboxylic acids, said acids having from 9 to 11 carbon atoms in the molecule and prepared by reacting olefins with carbon monoxide and water in the presence of acid catalysts, (2) glycerol, (3) phthalic anhydride and (4) 12-hydroxystearic acid, said components being employed in the ratio so that the equivalent weight of components (1) and (2) range from about 1 to about 1.3 times the equivalent weight of components (3) and (4).

References Cited by the Examiner

UNITED STATES PATENTS

| | | | |
|---|---|---|---|
| 1,995,970 | 3/1935 | Dorough | 260—78.3 |
| 2,682,514 | 6/1954 | Newey | 260—75 |
| 2,801,273 | 7/1957 | Bohlbro et al. | 252—433 |
| 2,853,474 | 9/1958 | Reynolds et al. | 260—78.3 |
| 2,940,982 | 6/1960 | Sullivan | 260—348 |
| 2,981,705 | 4/1961 | Heinrich et al. | 260—22 |
| 2,981,706 | 4/1961 | Heinrich et al. | 260—22 |
| 3,140,267 | 7/1964 | Bortnek et al. | 260—22 |
| 3,161,618 | 12/1964 | Kreps et al. | 260—75 |

FOREIGN PATENTS 212,853  2/1958  Australia.

LEON J. BERCOVITZ, *Primary Examiner.*

ALFONSO D. SULLIVAN, MILTON STERMAN, *Examiners.*

R. W. GRIFFIN, *Assistant Examiner.*